W. H. THURMOND,

Assignor of one-fourth to J. M., W. E. and G. F. THURMOND.

CAR COUPLING.

No. 10,622. Reissued July 7, 1885.

Attest

P. M. Knoblock.

H. E. Baulter

Inventor

William H. Thurmond, per Henry Orth his atty

THE NORRIS PETERS CO., PHOTO-LITHO., WASHINGTON, D. C.

UNITED STATES PATENT OFFICE.

WILLIAM H. THURMOND, OF FORSYTH, GEORGIA, ASSIGNOR OF ONE-FOURTH TO JAMES M. THURMOND, WARREN E. THURMOND, AND GEORGE F. THURMOND, OF SAME PLACE.

CAR-COUPLING.

SPECIFICATION forming part of Reissued Letters Patent No. 10,622, dated July 7, 1885.

Original No. 289,729, dated December 4, 1883. Application for reissue filed May 5, 1885.

*To all whom it may concern:*

Be it known that I, WILLIAM H. THURMOND, a citizen of the United States, residing at Forsyth, in the county of Monroe and State of Georgia, have invented certain new and useful Improvements in Car-Couplings; and I do hereby declare the following to be a full, clear, and exact description of the invention, such as will enable others skilled in the art to which it appertains to make and use the same, in which—

Figure 1:
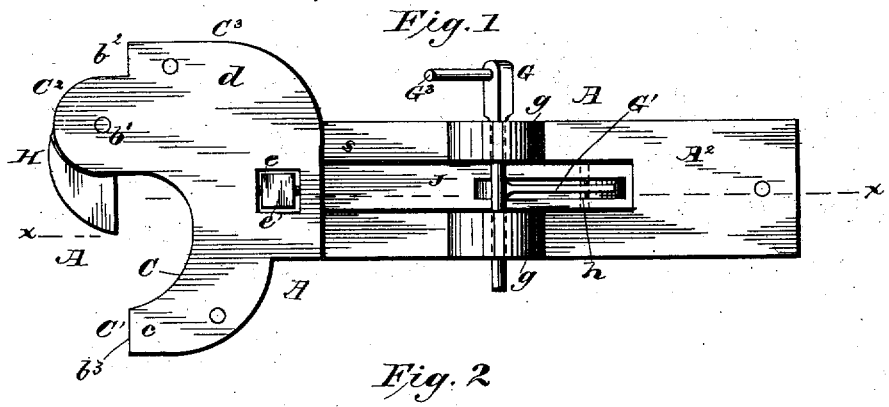
Figure 2:
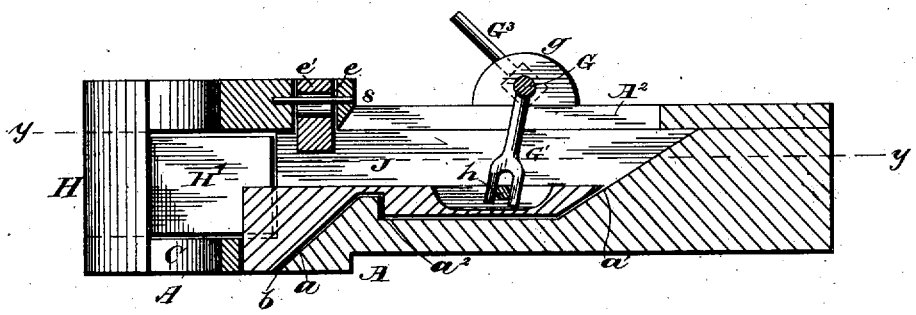
Figure 3:
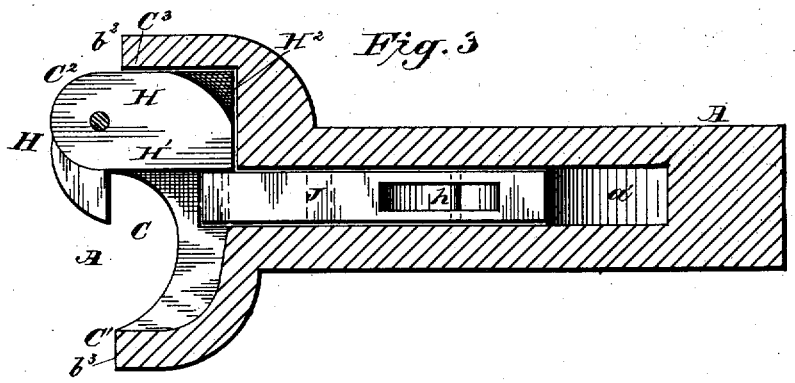

Figure 1 is a top view of my improved railroad-car coupler. Fig. 2 is a section taken longitudinally through the same in the vertical plane indicated by the dotted line *x x* on Fig. 1. Fig. 3 is a section taken horizontally through the coupler in the plane indicated by dotted line *y y*.

My invention relates to the well-known hooked couplers for cars or passenger-coaches; and it consists, essentially, in the devices which I shall hereinafter describe, reference being had to the annexed drawings.

A designates a draw-bar, which is recessed longitudinally and vertically, and provided in its longitudinal recess with backwardly-inclined surfaces *a a'*, the forward one of which forms a shoulder, $a^2$. The surface *a* leads down to an opening or recess, *b*, adapted to receive a vertical coupling-pin when it is necessary to use the well-known coupling-link. Anterior to this recess *b* is formed on the draw-bar a curved portion, C, a web, C', an ear, $C^2$, and a rectangular portion, $C^3$. This gives a general description of that part of the draw-bar which I designate the part A, and which may be formed entire. Upon this draw-bar section I apply a capping-section, which I shall now, for the purpose of description, denominate $A^2$. This part $A^2$ is adapted to be fitted squarely on the part A, and in practice it is a part thereof. The bottom of this part or capping-section $A^2$ is flat, and it is so constructed with its wings and ears *b' c d* and its vertical passage that it accurately fits upon the lower section of the coupler. This upper section of the coupler, which, let it be understood, conforms in every particular to the lower section, is constructed with ears *g g*, which are perforated transversely to receive a rock-shaft, G. Between the ears of the upper section of the draw-bar, and fast on the rock-shaft G, is a bifurcated arm, G', which receives between its prongs a pin, *h*, which is applied rigidly to a longitudinally-movable thrust-bar, J, fitted into the recess in the base portions of the draw-bar. On one end of the oscillating bar or rock-shaft G is an arm, $G^3$. Through the aperture *e* of the upper section of the draw-bar head is a latch, *e'*, the object of the lower beveled nose of which will be hereinafter explained. The upper section of the draw-bar is shouldered at *s*, and it is rigidly secured to the lower section by bolts or other suitable means. The ear *b'* has pivoted to it a coupling-hook, H, which is constructed with a tail, H', beveled at $H^2$, and also with shoulders, which are segments of circles concentric to the axis of movement of the said jaw. The tail of this locking jaw or hook H is always in such relation to the thrust-bar J that when the crank-arm above described is moved forward an uncoupling can be effected. It will be observed that the thrust-bar J has two movements—to wit, a longitudinal movement and a vertical movement. It will also be observed that there is a beveled surface, $H^2$, on the tail of the hooked coupling device H. Furthermore, it will be observed that I effect a safe self-coupler by very simple means.

The draw-bar is preferably cast entire. The jaw or brace is so applied to the draw-bar that it can be adjusted or set for coupling or uncoupling, the bumping being on the outside of the draw-head, so that the working parts are practically protected.

There is one very essential feature of my invention, which consists in the thrust-bar actuated as described, and so arranged that it acts to lock the pivoted coupling-jaw. By retracting the thrust-bar, the coupling-jaw is released, and an uncoupling can be effected.

It will be observed that when the thrust-bar is projected it is practically a lock for the coupling-jaw, and that when said bar is retracted it will allow an uncoupling. It will further be observed that the front face of the draw-head on its opposite sides has vertical faces $b^2$ $b^3$, which, when two draw-heads come into contact, act as buffer-faces and protect the coupling-hook and its pivotal connection against injury, the said draw-head performing the function of a buffer. Finally, referring to that part of the description in which mention is made of the latch $e'$, it will be observed that when the thrust-bar is moved backward by means of the rock-shaft G, said thrust-bar impinges upon the lower beveled face of said latch and lifts the same, and that as soon as the bar in its further backward movement has cleared the latch, the latter drops in front of it and holds the same against gravital forward motion.

I am aware of Patents Nos. 156,024, of 1874, and 138,405, of 1873, and the constructions therein set forth are not sought to be covered in this application.

Having described my invention, I claim—

1. In a coupler of the class described, the combination, with the coupling-hook arranged to oscillate on a vertical pivot, and a thrust-bar having a combined vertical and horizontal gravital movement across the plane of oscillation of the shank of the hook, of a latch having a gravital movement in a plane at right angles to that of the movement of the thrust-bar, substantially as and for the purpose specified.

2. In combination with the pivoted coupling-hook H and thrust-bar J, having vertical and longitudinal movement, and having pin $h$, the rock-shaft G, having rigid bifurcated arm G′, and crank-lever $G^3$, all arranged and operating as set forth.

In testimony whereof I affix my signature in presence of two witnesses.

WILLIAM H. THURMOND.

Witnesses:
W. D. GIBSON,
S. B. HEAD.